Oct. 22, 1968 K. C. BUGG Re. 26,480

ROTARY ELECTRICAL CONTACT ASSEMBLY

Original Filed Aug. 12, 1965 3 Sheets-Sheet 1

Inventor,
Kenly C. Bugg,
By Hume, Gross, Clement & Hume
Attys

ROTARY ELECTRICAL CONTACT ASSEMBLY

Original Filed Aug. 12, 1965 3 Sheets-Sheet 2

Inventor:
Kenly C Bugg,
By Hume, Brown, Clement & Hume
Attys

ROTARY ELECTRICAL CONTACT ASSEMBLY

Original Filed Aug. 12, 1965 3 Sheets-Sheet 3

Inventor:
Kenly C. Bugg,
Hume, Brown, Clement & Hume
Attys.

United States Patent Office

Re. 26,480
Reissued Oct. 22, 1968

26,480
ROTARY ELECTRICAL CONTACT ASSEMBLY

Kenly C. Bugg, Fort Wayne, Ind., assignor to Kendick Manufacturing Company, Fort Wayne, Ind., a corporation of Indiana Original No. 3,286,069, dated Nov. 15, 1966, Ser. No. 479,216, Aug. 12, 1965. Application for reissue Nov. 13, 1967, Ser. No. 693,028
13 Claims. (Cl. 200—166)

Matter enclosed in heavy brackets [ ] appears in the original patent but forms no part of this reissue specification; matter printed in italics indicates the additions made by reissue.

*ABSTRACT OF THE DISCLOSURE*

*A rotary electrical contact assembly which includes an elongated electrical conductor supported by a substantially cylindrical housing of electrically insulating material, the conductor being formed into an electrically conducting contact surface adapted to be associated with an electrical contact brush at least in selected positions of rotation of said housing, the ends of the conductor being threaded into the interior of the housing and formed as a twisted pair to form an electrical lead integral with and electrically connected to the contact surface.*

This invention relates to rotary electrical contact assemblies such as slip rings and selector switches and, more particularly, to a rotary contact construction which is particularly useful in environments in which there is a demand for a highly accurate and reliable electrical connection between rotating and stationary elements.

Electromechanical control systems have achieved a high degree of development and their use in computers, space vehicles, and similar installations has created a demand for highly accurate and reliable electrical slip ring assemblies. In such installations, it is necessary to reduce the sources of error to a minimum. Obviously, the device must have as low a noise level as possible and, likewise, must have a substantial life expectancy.

It is, therefore, among the objects of this invention to provide:

(a) A new and improved construction of rotary contact assembly which has a very low electrical noise level;

(b) A rotary contact assembly which is adapted to cooperate with a brush contact to maintain an efficient rotating electrical connection therebetween by providing a constantly varying area of contact for the brush, which produces a self-cleaning effect, thus dispelling contamination if it occurs;

(c) A rotary contact assembly with an electrical lead formed integrally therewith, having substantial flexibility and strength and, therefore, a long life and high resistance to breakage or disruption;

(d) A rotary contact assembly having a construction such that it can be accommodated in recesses on the surface of a cylindrical housing member, having various cross-sectional configurations;

(e) A rotary contact assembly which can be fabricated in accurately machined annular recesses which become the repository and positioning element for such contacts, so that accumulated dimensional tolerances in multiple contact installations can be held to a minimum; and (f) A rotary contact assembly which is capable of being fabricated in a relatively simple and inexpensive manner.

Further objects and advantages of this invention will become evident as the description proceeds and from an examination of the accompanying drawings which illustrate several embodiments of the invention, and in which similar numerals refer to similar parts throughout the several views.

Figure 1:
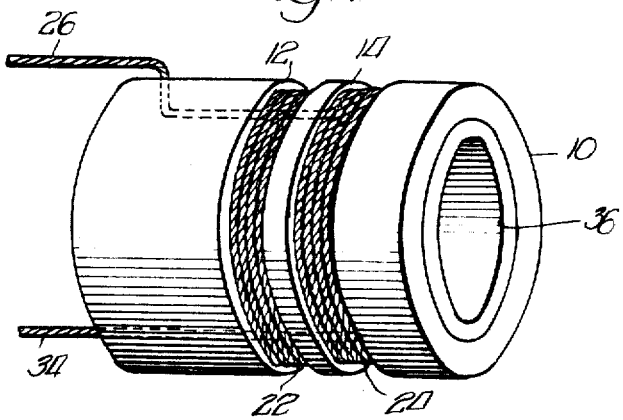
FIGURE 1 is a perspective view of a duel slip ring assembly, incorporating one form of the invention.

Referring now to FIGURE 1, a rotary electrical contact assembly incorporating the invention is shown therein, the contacts being in the form of slip rings. A substantially cylindrical housing member 10 is provided with annular grooves 12 and 14, also shown in cross-section in FIGURE 2. It is understood that any desired number of such grooves can be provided in a single housing member 10; the device here being shown with a pair of such grooves formed in closely spaced relation.

Figure 2:
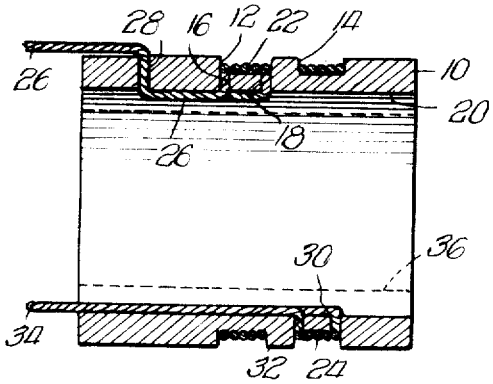
FIGURE 2 is a view in vertical cross-section of the ring assembly shown in FIGURE 1, the component parts being shown somewhat diagrammatically.

As best shown in FIGURE 2, each such groove is provided with a pair of openings, such as 16 and 18, which communicate with the interior 20 of the housing member 10. Each of the annular grooves 12 and 14 has wound in the base thereof a wire 22 and 24, respectively, forming the slip rings comprised of a plurality of contiguous turns of each said wire. The two ends of the wire 22 are threaded through the openings 16 and 18, and then are brought together and twisted to form a single lead 26 extending down the interior surface 20 of the housing 10 and passing through a suitable opening 28 in the housing 10 to the exterior surface thereof.

An alternative arrangement is shown with respect to the wire 24 and, as best shown in FIGURE 2, the two ends thereof are threaded through the two openings 30 and 32 extending into communication with the interior 20 of the housing 10 and are twisted together to form the single lead 34. For purposes of clarity, the interior core 36 provided within the housing 10, as shown in FIGURE 1, is shown only in dotted lines in FIGURE 2, the leads 26 and 34 in both instances being buried within the core 36. This is accomplished by molding the core 36 in place after the wires 22 and 24 are disposed as shown in FIGURE 2. Such a construction provides two benefits, namely, a means of securing the wires in place and, also, the molded inner diameter may be accurately dimensioned and placed.

The helical form of the winding in the slip ring will cause the individual turns to be disposed slightly at an angle to the path of the brush, which is normally in contact with the ring. For this reason, the brush will ride over more than one convolution of the wire as the ring revolves. This will result in the contact point between the brush and the ring being varied in extent as the ring rotates, and as the position of the brush shifts as it rides over the individual turns. This is highly advantageous in that a single spot contact between the brush and the ring is much more likely to lead to galling, which is a frequent source of noise. Likewise, possible contamination is accelerated by single spot contact. The irregular motion imparted to the brush also has a salutary effect in that it is in the nature of a self-cleaning action. With such movement, any debris which does tend to collect will be removed from the points of contact and will drop into the areas which are not normally in contact with the brush. The brush load in devices of the general nature for which the present invention is designed is preferably in the range of two to three grams which, of course, is extremely small, and this characteristic accentuates the need for the elimination of dirt or debris since only an infinitesimal amount of such material will cause serious disturbances in the operation of the equipment due to noise effects.

Figure 3:
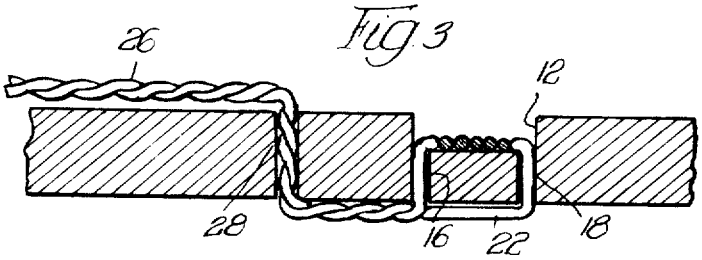
FIGURE 3 is an enlarged fragmentary view of a portion of the ring assembly shown in FIGURE 2, showing some of the components in greater detail.

FIGURE 3 illustrates in enlarged form the manner in which a single strand of wire 22 is used to form a slip ring in the recess 12. The helical winding of the wire to form the ring, and the twisting of the two wires emerging from the bores 16 and 18 to form a twisted pair 26 is shown.

Figure 4:
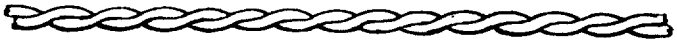
FIGURE 4 is a plan view of a fragmentary portion of a twisted pair of wires from which an alternative form of slip ring assembly may be fabricated.
Figure 5:
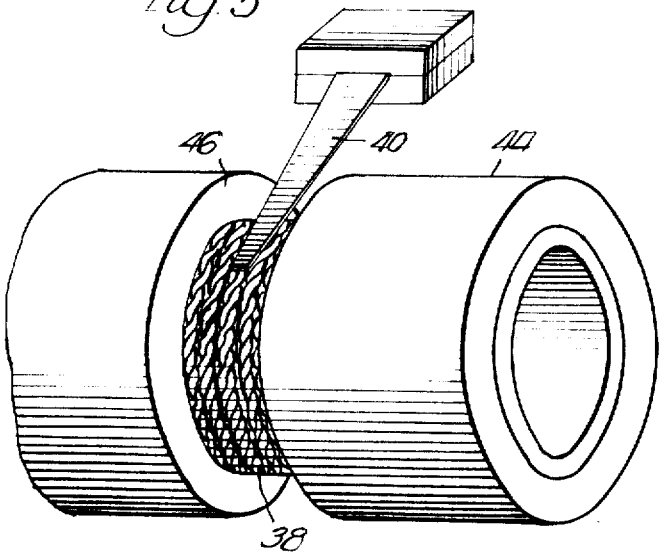
FIGURE 5 is an enlarged perspective view of a fragmentary portion of such an alternative form of ring assembly illustrating, somewhat diagrammatically, the manner in which the ring portion is fabricated, and showing it in operative association with a brush member.

FIGURE 4 discloses an enlarged fragmentary portion of a form of wire, used in the alternative form of ring assembly shown in FIGURE 5. As indicated in FIGURE 4, the wire is actually formed of a twisted pair of single strands. The use of this form of wire has several advantages, the principal among which is the provision of a very irregular surface on the slip ring 38, as illustrated in FIGURE 5, which is adapted to make contact with the brush 40. With this type of twisted wire forming the turns in the ring 38, the brush 40 not only rides over the convolutions of the helical form of winding, but also rides over the irregularities which are inherent in a twisted wire configuration. Thus, in addition to a vertical component of motion, a lateral movement is imparted to the brush as it moves across the twisted wires, so that it is urged first in one direction and then the other by the high points in the individual turns of wire. These points are alternately disposed on one side and then the other of the center line of a strand of the wire as best shown in FIGURE 4.

Figure 6:
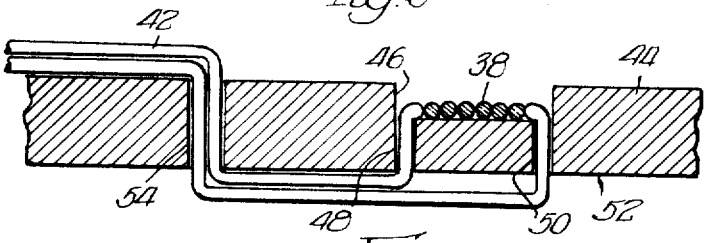
FIGURE 6 is a diagrammatic showing of the construction of the ring element shown in FIGURE 5, the wires being shown as untwisted, for purposes of clarity, although it should be understood that they are twisted in the actual embodiment, as described below.

FIGURE 6 is a largely diagrammatic showing of the form of construction illustrated in FIGURE 5 of the slip ring 38 and the lead 42 associated with it. As shown in that figure, the housing 44 is substantially the same as the housing 10 shown in FIGURE 3. The annular recess 46 has a plurality of helical turns of the wire formed of a twisted pair wound therein to form the ring 38. The two extremities of the wire are passed through the bores 48 and 50 into the interior 52 of the housing 44. These two extremities are brought together in the manner shown diagrammatically in FIGURE 6, and in turn, twisted to form a lead 42 which is formed of a twisted pair of twisted pairs of wire, and which passes back out through the bore 54 to the exterior of the housing 44 substantially in the same manner as the lead 26, shown in FIGURES 1 and 2.

A further advantage of the use of the twisted pair form of wire to form the ring is that twisting tends to impart a stiffness to the wire which aids substantially in the fabrication process since the twisted pair form of wire can be threaded through small openings with much better facility than if it were a single strand. This is particularly true of miniaturized components which utilize a very small diameter wire, such as .002 to .003 of an inch, which in a single strand form is very difficult to handle. Furthermore, the tendency of the wire to kink and become undesirably distorted is very greatly reduced in a twisted pair, and there is a substantial increase in its resistance to breakage. This latter characteristic is particularly advantageous with respect to the lead portion of the wire.

The fabrication of the slip ring from a helical form of winding of a twisted pair of wires, with the two ends of the winding in turn being twisted to form the electrical lead to the ring such as the leads 26 and 34 shown in FIGURES 1 and 2, produces additional advantages. The forming of the lead wire integrally with the ring eliminates the necessity of providing an electrical contact between a separate lead wire and a ring element. This is particularly important because many failures in slip ring assembly constructions take place at this point of contact between the lead wire and the ring. In the present invention, not only is this area of difficulty eliminated, but the lead wire itself is given an extra heavy construction, being actually formed of a twisted pair of wires which in themselves are each a twisted pair.

In conventional construction of the high-performance type of slip ring assemblies, which are the subject of this application, the establishing and finishing of the contact surface of the rings is normally a very elaborate procedure. In one method, the ring is molded into a cylindrical housing so that it is initially completely buried within the housing material. The housing material is then machined off down below the surface of the ring, leaving a V-shaped groove formed in the housing and in a portion of the ring itself, so as to expose the latter. The rings are then coated by electrically depositing a suitable metal, such as silver, thereon. In the present invention, such elaborate procedures are eliminated since the wire utilized to form the ring member can be properly treated prior to fabrication to obtain a contamination-free surface. The wire is, of course, formed of a metal suitable for this type of use, such as alloys of gold, platinum, silver, and other precious metals. The term "wire" in this disclosure is utilized to include the conventional wire of circular cross-section as well as other configurations, such as triangular, square, rectangular, or the like.

The use of wire to fabricate the slip ring assembly has an additional advantage, in that the core or housing may first have the appropriate annular recesses to receive the wire accurately machined therein. This approach permits the achieving of a dimensional tolerance in multiple ring installations that is impossible to achieve by a molding process, where rings are molded into such a housing. In addition, it is much less expensive to machine such recesses in a housing than to develop a mold which will properly position and support rings which are to be molded in such a housing. Still another advantage of the use of wire is that the rings can be placed in annular recesses having various cross-sectional configurations, since the wire will adapt itself to variations of this kind without any special procedures being required in the fabrication process.

Figure 7:
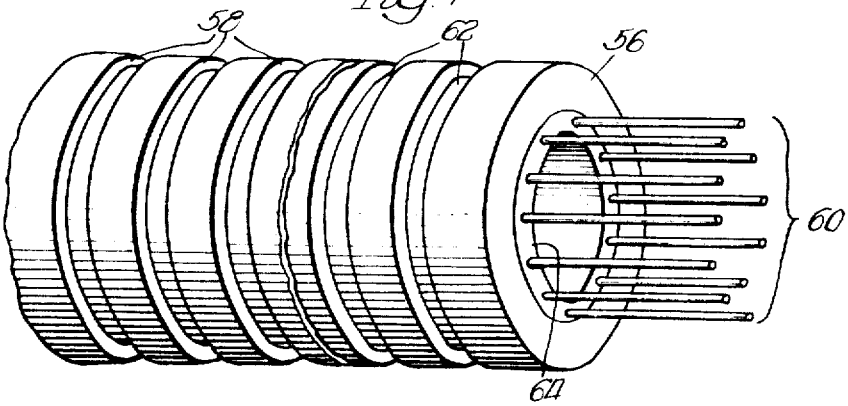
FIGURE 7 is a perspective view of an alternative embodiment of ring assembly incorporating the invention.

Still another embodiment of the invention is shown in FIGURE 7, where a housing 56 is provided having a plurality of annular recesses 58 provided therein, some of which are shown diagrammatically. The assembly can be fabricated substantially as previously explained with reference to the form of ring assembly shown in FIGURE 5. In addition, however, the leads indicated generally by the numeral 60 from each ring member 62 are brought out of one end of the housing 56 in symmetrical relation about the inner core 64.

It thus can be seen that the type of ring assembly construction contemplated has many advantages, among which are: (1) a substantial simplification of the process of manufacture; (2) the elimination of the necessity of providing an electrical contact between the lead wire and the slip ring; (3) substantial improvement of the nature of the contacts between the brush and the slip ring in that area of contact is not constant and, in addition, motion is imparted to the brush which produces a self-cleaning effect; (4) the noise factor in a device of this construction is very greatly reduced; (5) dimensional tolerances can be readily maintained; and (6) the surface of the ring can be provided with the necessary physical characteristics by merely conditioning the wire used to fabricate it in a suitable manner.

Figure 8:
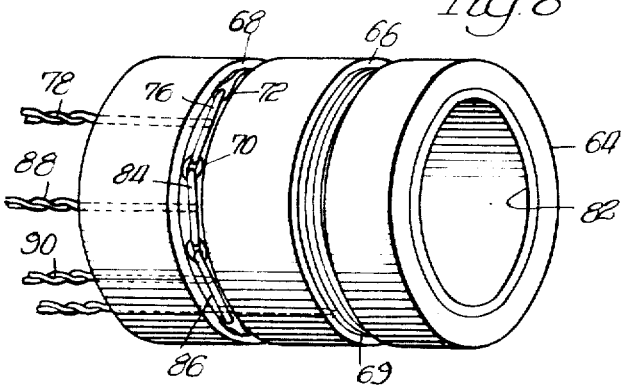
FIGURE 8 is a perspective view of a selector switch incorporating the invention.

Another embodiment of the invention is shown in FIGURE 8, in the form of a selector switch. A substantially cylindrical housing member 64 is provided with annular grooves 66 and 68. The groove 66 is provided with a slip ring 69 substantially identical to the ring shown in FIGURE 1. However, the groove 68 is provided with a different type of rotary contact, its construction being shown in greater detail in the cross-sectional view in FIGURE 9.

A plurality of suitable spaced openings such as the openings 70 and 72 are disposed in the base 74 of the groove 68. Threaded through the openings 70 and 72 and extending therebetween in the form of a plurality of contiguous turns is the wire 76, which is here shown as a single wire, but which may likewise be in the form of a twisted pair, as previously discussed with respect to the slip rings described above. The two ends of the wire 76 are brought together preferably within the interior of the housing 64, and twisted to form a single lead 78, which may extend down the interior surface 80 of the housing 64. As was shown and described in connection with the embodiment shown in FIGURES 1 and 2, the lead 78 may preferably be embedded in an interior core 82 which is molded in place after the lead wires are disposed as shown in FIGURE 8.

Additional segmental contacts, such as the segments 84 and 86, are provided with leads 88 and 90, respectively, as shown in FIGURE 8.

A selector switch having the construction just described will permit the making and breaking of selected circuits in consecutive relation if appropriate brushes, such as the brush 38 shown in FIGURE 5, are disposed in frictional contact with the segments. Obviously, more than one brush could be utilized to make contact at different points around the periphery of the housing 64.

Figure 9:
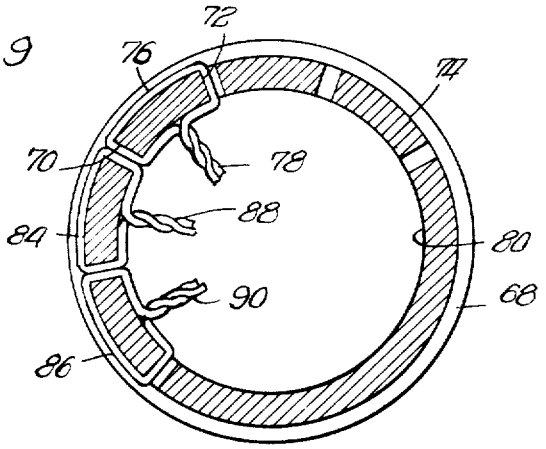
FIGURE 9 is a view in vertical cross-section of the selector switch assembly shown in FIGURE 8, the component parts being shown somewhat diagrammatically.
Figure 10:
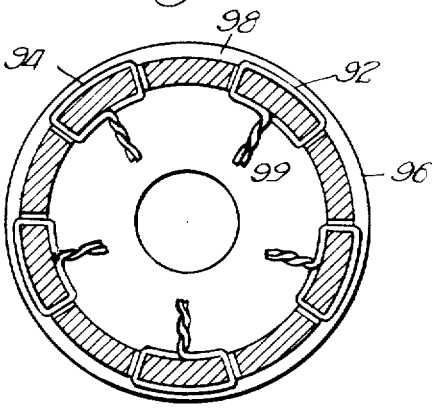
FIGURE 10 is a view in vertical cross-section of a selector switch assembly incorporating a modified form of segmental contact elements.

FIGURE 10 discloses a type of arrangement very similar to that shown in FIGURE 9, except that the segmental contacts, such as the segments 92 and 94, are more widely spaced about the periphery of the housing 96 in the groove 98. Obviously, both the length of such arcuate segments and their angular disposition about the longitudinal axis of the housing 96 can be appropriately selected so as to cause the switch to perform whatever function is desired. Furthermore, this pattern can be varied from one annular recess to the next so as to give an even wider range of electrical characteristics to the selector switch. Each segment may have an individual lead formed by twisting the ends of the wire forming the segment into a twisted pair, such as the lead 99 shown in FIGURE 10. These leads can be brought out from the housing in any suitable manner such as that previously described in connection with the form of assembly shown in FIGURES 1 and 2.

Figure 11:
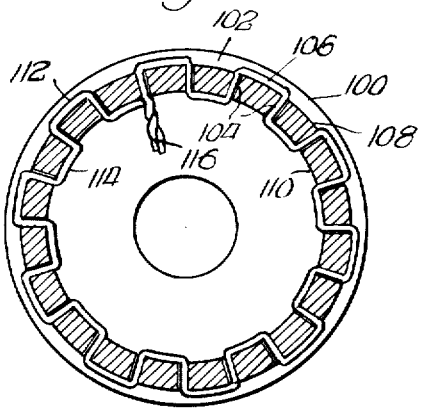
FIGURE 11 is a view in vertical cross-section of a selector switch assembly incorporating a segmental slip ring form of contact.

Still another form of segmental slip ring is illustrated in FIGURE 11. As shown in that cross-sectional view, the housing 100 is provided with an annular recess 102, in which there are a plurality of spaced openings 104. The wire 106 is threaded alternately in and out of the openings 104 so that there is alternately a segment of wire formed on the base 108 of the recess 102, and on the interior 110 of the housing 100, such as the segments 112 and 114, respectively. Here again, a plurality of contiguous turns are utilized so that, in effect, an interrupted slip ring is formed. The ends of the wire 106 can be formed into a twisted pair 116 to form a lead which can again be brought out from the housing in any suitable manner such as that previously described in connection with the form of assembly shown in FIGURES 1 and 2.

All of the advantages mentioned above for the slip ring assemblies incorporating the invention are equally applicable to the selector switch assemblies. Obviously, all of the various specific arrangements which are possible with this type of construction have not been illustrated, but each of them would have the same advantages previously identified as being inherent in this type of construction.

In the drawings and specification, there have been set forth several preferred embodiments of the invention and, although specific terms are employed, they are used in a generic and descriptive sense only and not for purposes of limitation. Changes in form and in the proportion of parts, as well as the substitution of equivalents, are contemplated, as circumstances may suggest to render expedient, without departing from the spirit or scope of this invention as further defined in the following claims.

What is claimed is:

1. A rotary electrical contact assembly comprising: a substantially cylindrical housing of electrically insulating material; an annular recess in said housing; an elongated electrical conductor wound in a plurality of contiguous turns in said recess to form a ring of conducting material in the base of said recess, and an opening in said housing on each side of said ring, each end of said conductor threaded through one of said openings in said housing, and then formed as a twisted pair to form a lead to said ring of conducting material, said lead extending from said ring to one end of said housing.

2. A rotary electrical contact assembly of the character described in claim 1, further characterized in that said housing is provided with a core encasing said lead.

3. A rotary electrical contact assembly comprising: a substantially cylindrical housing of electrically insulating material; an annular recess in said housing; and an elongated electrical conductor formed of a twisted pair of elongated electrical conductors, said first-named conductor wound in a plurality of contiguous turns in said recess to form a ring of conducting material in the base of said recess, said first-named conductor threaded through a suitable opening adjacent said turns to form a lead to said ring of conducting material extending therefrom to one end of said housing.

4. A rotary electrical contact assembly of the character described in claim 3, further characterized in that said housing is provided with a core encasing said lead.

5. A rotary electrical contact assembly comprising: a substantially cylindrical housing member; at least one annular recess in the outer surface thereof; a plurality of elongated electrical conductors twisted to form a single twisted electrical conductor, said twisted conductor wound in a plurality of turns in said recess to form a ring of conducting material having an irregular surface, the extremities of said twisted conductor threaded through openings in said housing member substantially contiguous with opposite lateral edges of said ring of conducting material so as to extend into the interior of said cylindrical housing member; and a lead element extending from said interior of said housing member to the exterior thereof formed of the twisted extremities of said twisted conductor.

6. A rotary electrical contact assembly of the character described in claim 5, further characterized in that said housing member is provided with a core encasing said lead element.

7. A rotary electrical contact assembly of the character described in claim 5, further characterized in that said housing member is provided with a plurality of annular recesses in the outer surface thereof; each said recess having a ring of conducting material formed therein; and each said ring provided with a single lead element extending from said interior of said housing member to the exterior thereof.

8. A rotary electrical contact assembly comprising: a substantially cylindrical housing of electrically insulating material; an annular recess in said housing; an elongated electrical conductor wound in a plurality of contiguous turns on at least a segment of said housing within said recess to form an arcuate conducting element; and openings in said housing through which the ends of said conductor are threaded into the interior of said housing, said ends formed as a twisted pair to form a lead to said arcuate element of conducting material.

9. A rotary electrical contact assembly of the character described in claim 8, further characterized in that said lead extends from said element to one end of said housing, and said housing is provided with a core encasing said lead element.

10. A rotary electrical contact assembly comprising: a substantially cylindrical housing of electrically insulating material; an annular recess in said housing; a plurality of electrical conductors each wound on a segment of said housing within said recess to form a plurality of arcuate conducting elements spaced around said housing in said recess; and openings in said housing through which the ends of each said conductor are threaded into the interior of said housing, said ends formed as a twisted pair to form a lead to the arcuate conducting element associated therewith.

11. A rotary electrical contact assembly of the character described in claim 10, further characterized in that each said lead extends from said element to one end of said housing, and said housing is provided with a core encasing each said lead element.

*12. A rotary electrical contact assembly comprising: a substantially cylindrical housing of electrically insulating material; an annular recess in said housing; an electrical conductor wound on a segment of said housing within said recess to form an arcuate conducting element in said recess; and openings in said housing through which the ends of said conductor are threaded into the interior of said housing, said ends formed as a twisted pair to form a lead to the arcuate conducting element associated therewith.*

*13. A rotary electrical contact assembly of the character described in claim 12, further characterized in that said lead extends from said element to one end of said housing, and said housing is provided with a core encasing said lead element, and said lead element is encased in electrically insulating material.*

No references cited.

ROBERT K. SCHAEFER, *Primary Examiner.*

H. O. JONES, *Assistant Examiner.*